3,518,104
COATED CASTING BELT
Everett L. Plyler, Raleigh, N.C., assignor to Monsanto Company, St. Louis, Mo., a corporation of Delaware
No Drawing. Filed July 22, 1966, Ser. No. 567,092
Int. Cl. B44d 1/14; B32b 15/08; B29c 1/00
U.S. Cl. 117—5.3          4 Claims

ABSTRACT OF THE DISCLOSURE

An endless casting belt suitable for making foam sheet products, possessing releasable characteristics, sufficient flexibility to pass around rollers and capable of withstanding relatively high temperatures without stretching or becoming distorted, said belt having a silicone-primer silicone-rubber surface thereon.

---

The present invention relates to casting belts employed in the production of thin foam sheets and more particularly to a method for coating said belts with a material which has releasable properties with respect to the foamable materials.

In the production of thin continuous sheets of cellular foam, the release characteristics of the casting belt are critical. The provision of a belt suitable for making good quality foam products is involved for several reasons. A most important requirement is that the belt is made from a material possessing sufficient strength and accompanying flexibility to pass around rollers in a looped arrangement wherein the belt is subjected to substantial bending. Also the belt must be made from materials that will withstand relatively high temperatures without stretching or becoming distorted. Since the belt is an endless structure, it is essential that the ends be joined together by some manner.

Experience has shown that when joining belt-type materials other than butt-weldable metals most of these materials are not desirable because of the increased thickness caused by overlapping at the point of joinder. The seams adversely affect the uniform thickness of the foam products and are therefore objectionable. It is well known that special procedures must be undertaken to obtain good adhesion between polymeric silicone rubber compositions and the common metals. Generally these polymeric materials delaminate or peel from the metals, particularly when the metal product is a flexible belt which is advanced along a tortuous path. The metal belts have been found to be exceptionally well suited for producing sheet foamed products. The malleable metals such as bronze, brass, stainless steel, copper and zinc based alloys are preferred, particularly Phosphor bronze. Open mesh wire belts fabricated from these materials possess the requisite flexibility, strength and withstand elevated temperatures. Therefore, the provision of a method for making these belts amenable to coating with a material having good release properties would represent a substantial improvement in the foam manufacturing art.

With the foregoing in mind, a primary object of the present invention is to provide a method for filling the interstices of an open mesh wire belt with a sealer composition on which a room temperature vulcanizing silicone rubber adheres to readily.

Another object of the present invention is to provide a method for coating a metal wire belt with a release material to facilitate the production of better quality foam products.

Still another object of the invention is to provide a method for obtaining a base interface on metal wires which room temperature vulcanizing silicone rubber adheres to readily.

Other objects and advantages to the present invention will be apparent from the detailed description to follow.

In accordance with this invention, an open-mesh wire belt fabricated from Fourdrinier wire, for example, is prepared for coating with a special silicone rubber primer which is comprised of a silicone based compound dissolved in a mixture of acetone and isopropanol. The primer adheres to the metal wires and several applications are made to enclose the interstices of the belt. In addition to providing a base interface which later promotes bonding between the belt and a release material, the primer functions to seal the open-mesh and thus prevent bleeding through of the subsequently applied release material. After the primer has dried, several applications of a room temperature vulcanizing silicone rubber (RTV) are applied on the primed belt. Two or three hours are preferred between coatings and a period of about 24 hours curing time at room temperature is required before the coated belt is ready for use.

The wire substrate employed to provide a suitable foam casting belt in accordance with the present invention should be constructed from fine denier wires having good bending properties. The wires should be tightly woven to provide a small-mesh construction in the range of about 50 to 90 meshes. The well known Fourdriner wire belts are highly preferred for the substrate employed in the practice of this invention. Preparation of the belt is accomplished by laying the belt on a flat surface and applying several coats of the primer at intervals until the interstices are completely sealed. The primer may be applied by brushing, spraying, dipping or rolling. Usually at least three primer coats are required to adequately seal the wire substrate. The primer is a silicone based compound such as marketed by General Electric which is designated G.E. SS–4004.

The primer-coated wire belt is coated with a room temperature vulcanizing silicone rubber (RTV-silicone rubber). At least three coats are required to build up the desired thickness to approximately 15 to 40 mils on the primed belt. The RTV-silicone rubber may be applied by either of the techniques which include spraying, brushing or rolling. In working with all of these techniques it is necessary to thin the releasable coating material with a mineral spirit thinner to a paintable consistency to obtain a smooth uniform surface finish. Unless the viscosity is less than about 8 poises the surface has the appearance of an orange peel which is imparted later to the surface of the foamed product. Preferably the RTV-silicone rubber is rolled onto the primer-coated belt at intervals of about two to three hours. Usually three or four coats will be sufficient. When the last coat has been applied, about 24 hours at room temperature is required to complete the curing of the rubber after which the surface is extremely smooth. The RTV-silicone rubber compounds are available from General Electric as described in G.E. Technical Data Book S–3B. The composition may be tailored to accelerate curing time by varying the amounts and type of catalysts employed.

Casting belts prepared by the method of the present invention exhibit extremely smooth surfaces which impart to the products foamed thereon smooth, glossy surfaces which indicate a good product. The release properties of the belt were found to be excellent after several hundred runs. No difficulties were experienced with adhesion of foamable materials to the coated belt or delamination of the RTV-silicone coating compound from the wire belt. In the past both of these problems have plagued the foam producers.

Another important result accomplished by the present invention is a casting belt which is flexible yet possesses sufficient strength and withstands high temperatures to last for long periods. A further important aspect of this invention resides in the fact that the interstices of the belt are completely closed to avoid penetration of the liquid foamable formulation deposited upon the belt prior to foaming. This accomplishment overcomes the serious problem caused with even minor penetrations which occur where only pinholes are present in the belt. Quality of the foam products is adversely affected by any penetration whatsoever. Therefore, precautions must be undertaken to insure that the interstices of the previously foraminous belt are completely closed.

Since it is apparent that changes and modification can be made in the above-described invention without departing from the scope thereof, it is to be understood that the invention is not to be limited except as set forth in the appended claims.

What is claimed is:

1. A casting belt for production of thin layers of foam which comprises a flexible metal substrate in the form of an endless wire belt, said substrate having an open small-mesh construction and a release material consisting of silicone-primer and silicone-rubber bonded firmly to said substrate, said material completely closing the interstices of said substrate.

2. The article of claim 1 wherein the silicone rubber has a thickness of approximately 15–40 mils.

3. The article of claim 1 wherein the substrate has a mesh size ranging from about 50 to 90.

4. The belt in accordance with claim 1 wherein the flexible metal substrate is Phosphor bronze.

References Cited

UNITED STATES PATENTS

| | | | |
|---|---|---|---|
| 2,199,529 | 5/1940 | Shackelford | 117—99 X |
| 2,488,446 | 11/1949 | Swiss | 117—5.3 X |
| 3,072,497 | 1/1963 | Guglielmo | 117—99 X |
| 2,718,791 | 9/1955 | Hose et al. | 74—239 |
| 3,177,113 | 4/1965 | Golden et al. | 74—239 X |
| 3,368,928 | 2/1968 | Chadha et al. | 117—75 X |

FOREIGN PATENTS

| | | |
|---|---|---|
| 1,365,424 | 5/1964 | France. |

WILLIAM D. MARTIN, Primary Examiner

D. COHEN, Assistant Examiner

U.S. Cl. X.R.

74—239; 117—75, 79, 99; 161—95